United States Patent
Bennett

(10) Patent No.: US 7,028,583 B2
(45) Date of Patent: Apr. 18, 2006

(54) AXLE ASSEMBLY WITH TRANSVERSE MOUNTED ELECTRIC MOTORS

(75) Inventor: John L. Bennett, Fraser, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 12 days.

(21) Appl. No.: 10/630,499

(22) Filed: Jul. 30, 2003

(65) Prior Publication Data

US 2005/0023885 A1 Feb. 3, 2005

(51) Int. Cl.
*F16H 37/06* (2006.01)
*B60K 1/00* (2006.01)

(52) U.S. Cl. .................. 74/661; 475/231; 180/65.6

(58) Field of Classification Search .............. 74/661, 74/664; 475/230, 231; 180/65.6, 65.7
See application file for complete search history.

(56) References Cited

U.S. PATENT DOCUMENTS

| | | | | |
|---|---|---|---|---|
| 3,534,825 A | * | 10/1970 | Reffle | 180/252 |
| 4,270,622 A | * | 6/1981 | Travis | 180/65.4 |
| 4,588,040 A | | 5/1986 | Albright, Jr. et al. | |
| 4,819,512 A | * | 4/1989 | Azuma et al. | 475/2 |
| 5,028,828 A | * | 7/1991 | Felkai et al. | 310/83 |
| 5,100,368 A | | 3/1992 | Chien | |
| 5,201,691 A | | 4/1993 | Doyle | |
| 5,558,589 A | | 9/1996 | Schmidt | |
| 5,651,748 A | * | 7/1997 | Adam et al. | 475/204 |
| 5,827,148 A | | 10/1998 | Seto et al. | |
| 5,951,424 A | | 9/1999 | Briceland | |
| 6,041,877 A | | 3/2000 | Yamada et al. | |
| 6,053,833 A | | 4/2000 | Masaki | |
| 6,083,138 A | | 7/2000 | Aoyama et al. | |
| 6,083,139 A | | 7/2000 | Deguchi et al. | |
| 6,090,005 A | | 7/2000 | Schmidt et al. | |
| 6,098,733 A | | 8/2000 | Ibaraki et al. | |
| 6,110,066 A | | 8/2000 | Nedungadi et al. | |
| 6,170,587 B1 | | 1/2001 | Bullock | |
| 6,276,474 B1 | * | 8/2001 | Ruppert et al. | 180/65.6 |
| 6,358,176 B1 | | 3/2002 | Nauheimer et al. | |
| 6,371,878 B1 | | 4/2002 | Bowen | |
| 6,378,638 B1 | | 4/2002 | Mizon et al. | |
| 6,398,685 B1 | | 6/2002 | Wachauer et al. | |
| 6,401,850 B1 | | 6/2002 | Bowen | |
| 6,408,230 B1 | * | 6/2002 | Wada | 701/1 |
| 6,427,797 B1 | * | 8/2002 | Chang | 180/247 |
| 6,481,519 B1 | | 11/2002 | Bowen | |
| 6,499,549 B1 | | 12/2002 | Mizon et al. | |
| 2003/0127260 A1 | * | 7/2003 | Angeles | 180/23 |

OTHER PUBLICATIONS

Hybrid Diesel-Electric Engines, http://www.g2mil.com/hybrid.htm.

* cited by examiner

*Primary Examiner*—Tisha Lewis
(74) *Attorney, Agent, or Firm*—Carlson, Gaskey & Olds

(57) ABSTRACT

An axle assembly includes a first and a second electric motor which drive a gearbox assembly substantially therebetween. The electric motors drive the gearbox assembly which drives the vehicle wheels through a first and second axle shaft located along a first axis. The electric motors are located along axes which are substantially transverse to the first axis. The electric motors drive the gearbox assembly which includes a first stage gear reduction, a second stage gear reduction and a third stage gear reduction. A relatively lightweight and compact axle assembly is thereby provided which will benefit from an electric motor of reduced size.

22 Claims, 4 Drawing Sheets ated schematically). The electric motors 24 are driven
AXLE ASSEMBLY WITH TRANSVERSE MOUNTED ELECTRIC MOTORS

BACKGROUND OF THE INVENTION

The present invention relates to an axle assembly which utilizes a plurality of electric motors, and more particularly to an axle configuration which locates the electric motors in a transverse arrangement to the axle.

There is an increasing demand for the use of hybrid electric driven and hybrid electric assisted vehicles. Hybrid electric vehicles typically utilize electric motor driven axles which are often of a multi-axle configuration in military and specialty vehicle systems.

The electric motors are typically sized to meet both torque and speed requirements which may not be the most effective for the operational requirements of such vehicles. Relatively large electric motors are often utilized to meet the torque requirements which may result in an oversized motor for most operational conditions. Moreover, the relatively large electric motors may be difficult to package in a multi-axle vehicle configuration.

Accordingly, it is desirable to provide a lightweight and compact electric motor driven axle configuration which allows the usage of a multiple of relatively smaller electric motors for incorporation into a multi-axle military and specialty vehicle system.

SUMMARY OF THE INVENTION

The axle assembly according to the present invention includes a first and a second electric motor which drives a gearbox assembly substantially therebetween. The electric motors drive the gearbox assembly which drives the vehicle wheels through a first and second axle shaft located along a first axis. The electric motors are located along axes which are substantially transverse to the first axis.

In one embodiment, the electric motors drive the gearbox assembly which includes a first stage gear reduction, a second stage gear reduction and a third stage gear reduction. The third stage gear reduction is preferably a two-speed reduction gear set that includes a differential gear set substantially contained within the two-speed reduction gear set. A relatively lightweight and compact axle assembly is thereby provided which will benefit from an electric motor of reduced size.

Another axle assembly includes a single speed electric carrier with two motors. Yet another axle assembly utilizes only a single electric motor for yet another vehicle configuration without major modification to the axle assembly.

The present invention therefore provides a lightweight and compact electric motor driven axle configuration which allows the usage of a multiple of relatively smaller electric motors for incorporation into a multi-axle military and specialty vehicle system.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
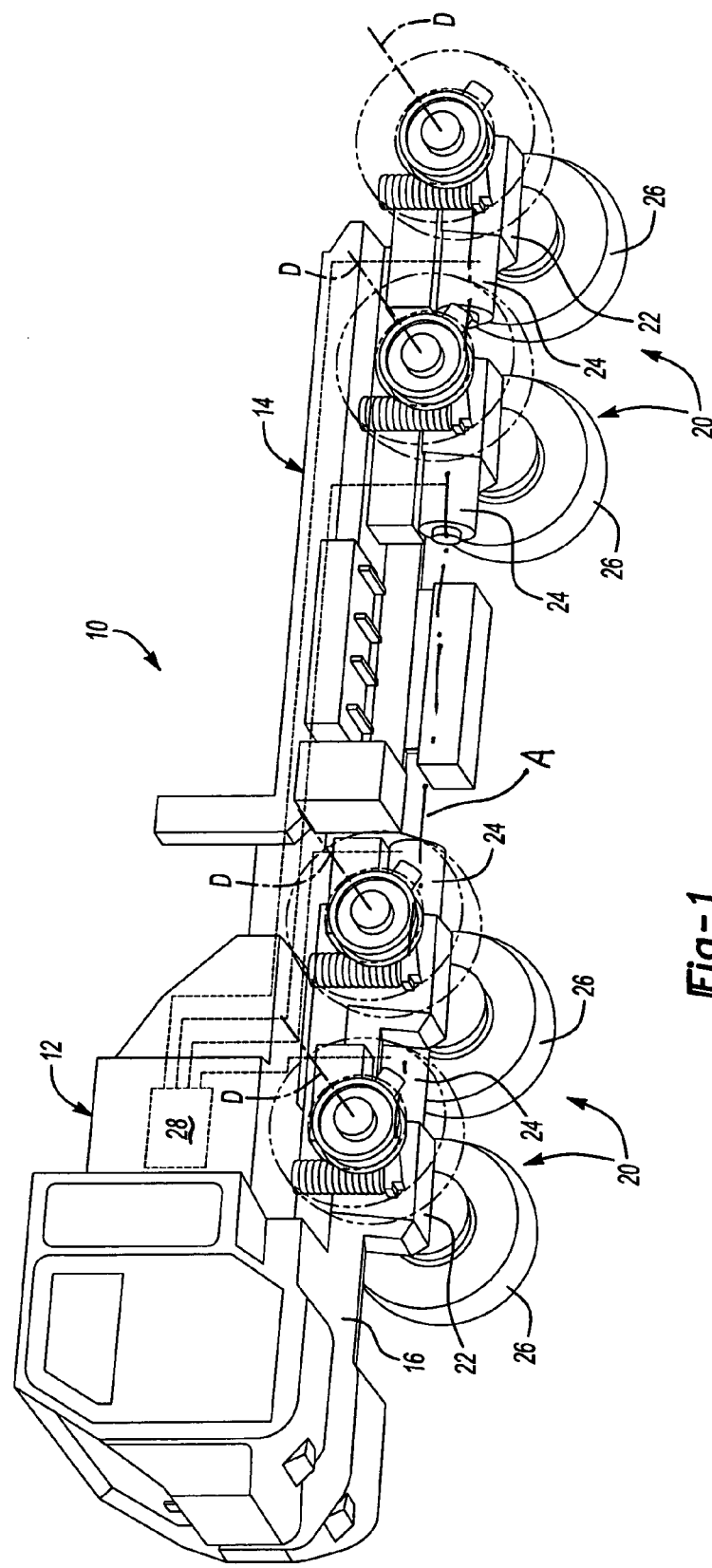
FIG. 1 is a general perspective view an exemplary multi-axle vehicle embodiment for use with the present invention.

FIG. 1 illustrates a schematic partial phantom view of a multi-axle vehicle 10 having a body 12 supported upon a frame 14. The frame 14 preferably includes a pair of main longitudinal members 16. It should be understood that although a particular vehicle arrangement is disclosed in the illustrated embodiment, other vehicles will benefit from the present invention.

A multiple of axle assemblies 20 each includes an axle 22 driven by one or more electric motors 24. Each axle assembly 20 defines an axis of rotation D substantially transverse the longitudinal members 16 to drive one or more wheel assemblies 26 supported by a suspension assembly 27 (illustrated schematically). The electric motors 24 are driven by a prime mover 28 which is preferably a hybrid electric drive which powers each of the axle assemblies 20 by powering the electric motors 24. It should be understood, however, that other prime movers such as diesel engines, gas turbines among others will also benefit from the present invention.

Figure 2:
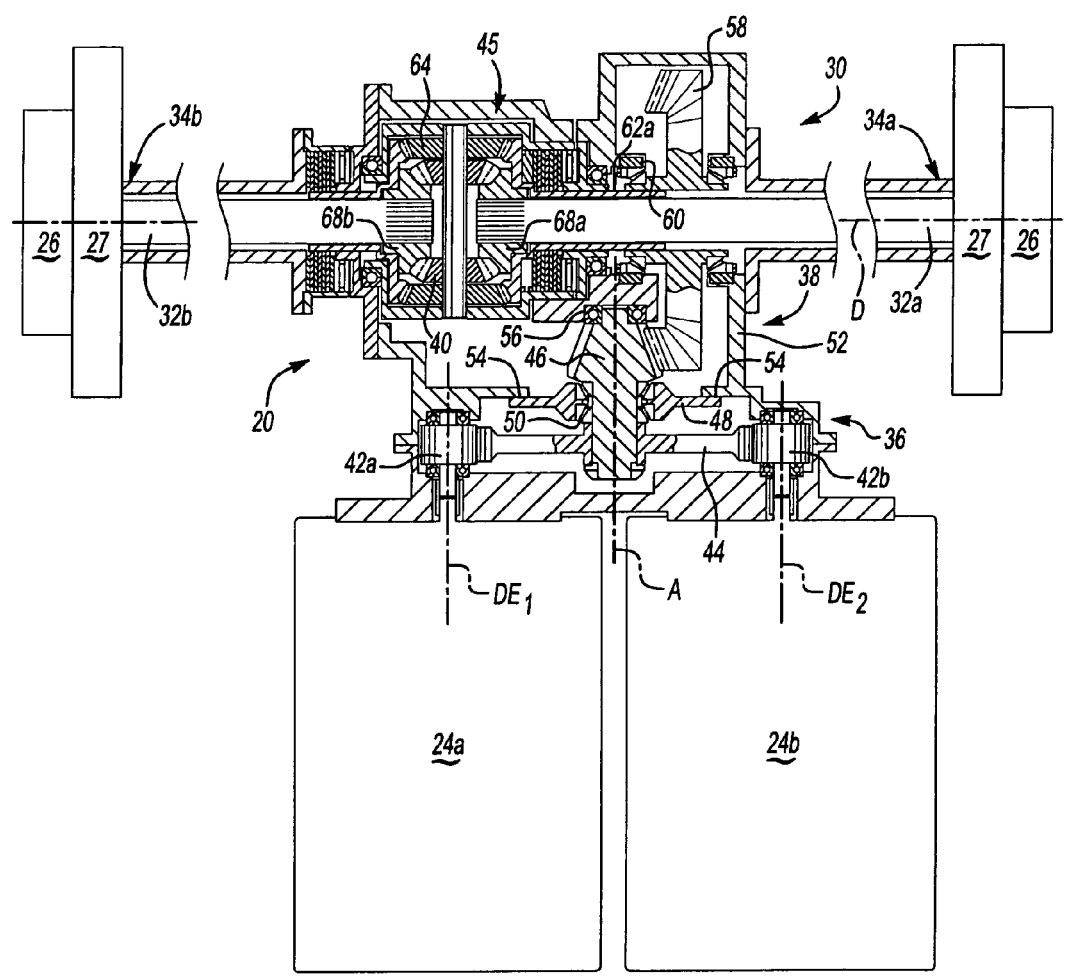
FIG. 2 is a schematic sectional view of an axle assembly of the present invention.

Referring to FIG. 2, a first and a second electric motors 24a, 24b drive a gearbox assembly 30 which drives the wheels 26 through a first axle shaft 32a and a second axle shaft 32b located along axis D and contained with an axle housing 34a, 34b. The electric motors 24a, 24b are located along axes DE1 and DE2 which are substantially transverse to axis D. The electric motors 24a, 24b drive the gearbox assembly 30 which includes a first stage gear reduction 36, a second stage gear reduction 38 and a differential 40.

The first stage gear reduction 36 is driven by the electric motors 24a, 24b. The electric motors 24a, 24b drive a drive gear 42a, 42b respectively. Each drive gear 42a, 42b drives a single gear 44 which mounts a pinion gear 46 of the second stage gear reduction 38. Preferably, the single gear 44 and the pinion gear 46 are defined along a common axis A which is substantially parallel to the axes DE1 and DE2. The first stage gear reduction 36 preferably includes helical and/or herringbone gears.

The pinion gear 46 of the second stage gear reduction 38 is mounted within a bearing cage 48 and bearing 50 which are mounted to a gearbox housing 52. It should be understood that the housing 52 may be constructed of multiple housing portions for assembly and maintenance purposes. The bearing cage 48 is axially adjustable relative the housing 52 through shims (illustrated schematically at 54). The pinion gear 46 is further supported at the gear end by a second pinion bearing 56. That is, the pinion gear 46 is supported by the single gear 44 at one segment, the second pinion bearing 56 at a second segment and at a third segment between the first and second segments by the bearing cage 48 and bearing 50. A rigid, yet adjustable mounting is thereby provided.

The pinion gear 46 drives a hollow ring gear 58 through which the axle shaft 32a passes. That is the ring gear is coaxial with axis D. The hollow ring gear 58 is preferably mounted to an adjustment ring 60 mounted to the housing 52. The adjustment ring 60 provides for axial adjustment of the ring gear 58 to further assure proper tooth contact between the pinion gear 46 and the hollow ring gear 58.

In the example shown in FIG. 2, the hollow ring gear 58 drives a third stage gear reduction 45 through an input side gear 62a which is coaxial with axis D. That is, the hollow ring gear 58 is mounted to the input side gear 62a for rotation therewith.

The third stage gear reduction 45 is preferably a two-speed reduction gear set 64 that includes the differential 40, which is substantially contained within the two-speed reduction gear set 64, and which drives a first differential axle side gear 68a mounted to the first axle shaft 32a and a second differential axle side gear 68b which drives the second axle shaft 32b.

The differential 40 is preferably nested within the two-speed reduction gear set 64. For further understanding of other aspects of the third stage gear reduction 45 and associated components thereof, attention is directed to U.S. Pat. No. 6,843,750, issued Jan. 18, 2005, entitled TWO-SPEED GEARBOX WITH INTEGRATED DIFFERENTIAL, which is assigned to the assignee of the instant invention and which is hereby incorporated herein in its entirety. A relatively lightweight and compact axle assembly is thereby provided which will benefit from an electric motor of reduced size.

Figure 3:
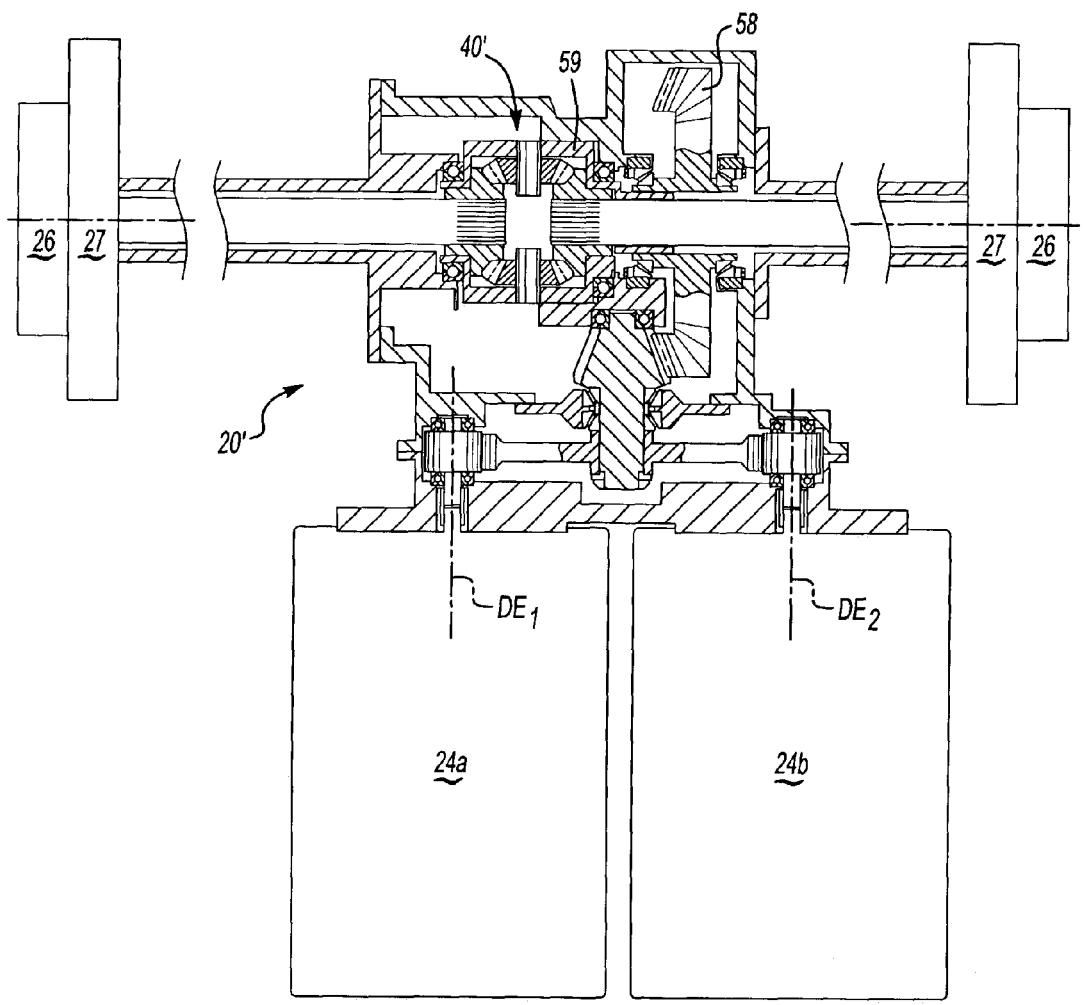
FIG. 3 is a schematic sectional view of an axle assembly of the present invention.

Referring to FIG. 3, an axle assembly 20' provides a differential 40' for a single speed electric carrier that otherwise operates as described with reference to the FIG. 2 two-speed electric carrier except that the hollow ring gear 58 drives a single speed electric carrier 59 of which is coaxial with axis D. That is, the hollow ring gear 58 is mounted to the differential 40' for rotation therewith. The single speed electric carrier is particularly preferred for a vehicle which, for example only, is of a lighter weight or which requires less off-road capability.

Figure 4:
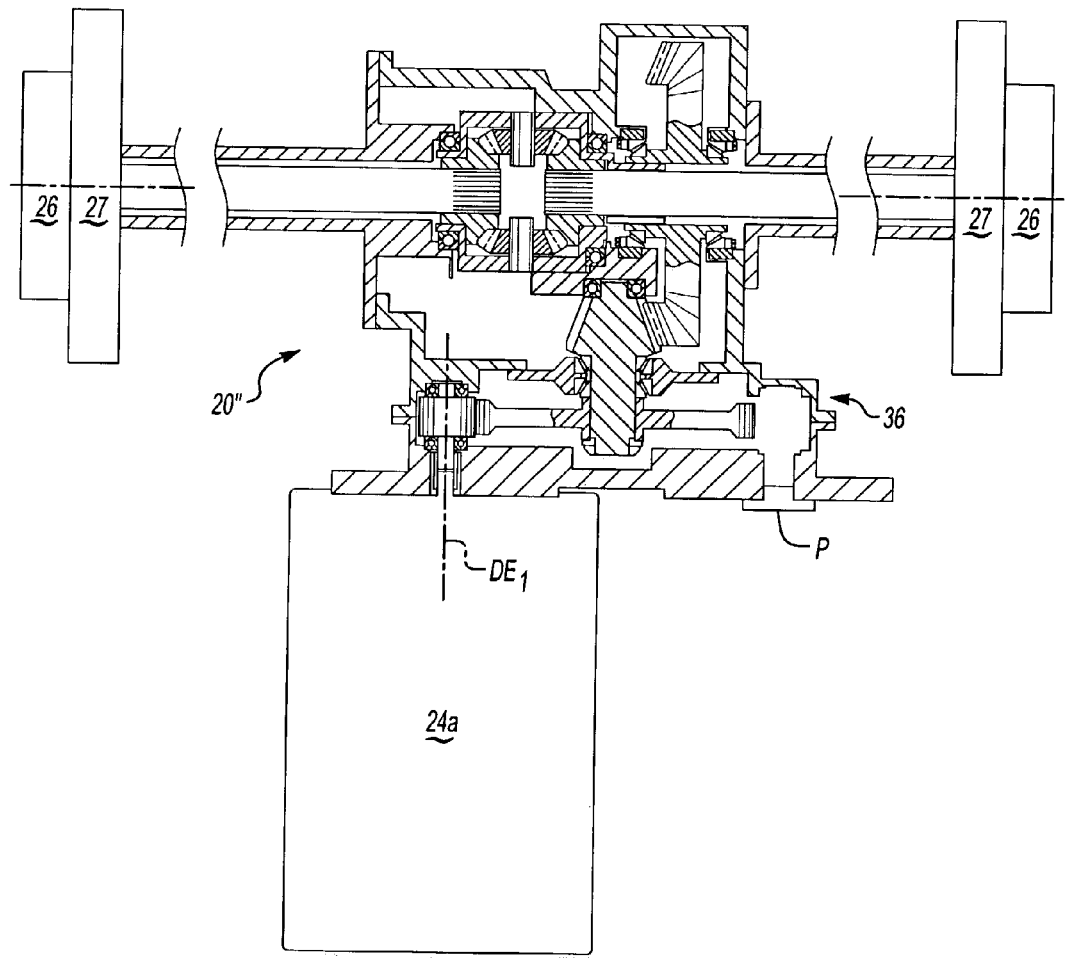
FIG. 4 is a schematic sectional view of an axle assembly of the present invention.

Referring to FIG. 4, another axle assembly 20'' utilizes only a single electric motor 24a to illustrate that the axle assembly 20' of FIG. 3 is module in nature. In other words, the first stage gear reduction 36 of the axle assembly 20'' eliminates the electric motor 24b and the drive gear 42b to provide a relatively lighter duty axle assembly 20'' for yet another vehicle configuration without major modification to the axle assembly 20'. The aperture for eliminated electric motor 24 is closed by a plug P or the like. Axle assembly 20'' otherwise operates as describe with reference to the FIGS. 2 and 3 axle assemblies. It should be understood that various combinations of the axle assemblies described herein may be provided to particularly tailor an axle assembly to a particular vehicle in a modular manner.

It should be further understood that various bearing and seal locations are included within the gearbox. One of ordinary skill in the art, with the benefit of this disclosure, will consider the various bearing and seal locations to be an ordinary engineering problem such that intricate details thereof need not be fully discussed herein.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. An axle assembly comprising:
a first axle shaft defined substantially along a first axis of rotation;
a second axle shaft defined substantially along said first axis of rotation;
at least one electric motor defined substantially along a second axis of rotation transverse to said first axis of rotation, said at least one electric motor for driving both said first and said second axle shafts;
a first stage gear reduction driven by said at least one electric motor, said first stage gear reduction including a drive gear driven about said second axis of rotation by said at least one electric motor and a driven gear driven by said drive gear;
a second stage gear reduction driven by said first stage gear reduction, said second stage gear reduction including a pinion gear driven by said driven gear and a ring gear driven about said first axis of rotation by said pinion gear, said first axle shaft extending through said ring gear;
a differential driven by said second stage gear reduction, said first axle shaft and said second axle shaft driven by said differential; and
a third stage gear reduction driven by said ring gear and coupled to said differential.

2. An axle assembly comprising:
a first axle shaft defined substantially along a first axis of rotation;
a second axle shaft defined substantially along said first axis of rotation;
at least one electric motor defined substantially along a second axis of rotation transverse to said first axis of rotation, said at least one electric motor for driving both said first and second axle shafts, wherein said at least one electric motor comprises a first electric motor defined substantially along said second axis of rotation and a second electric motor defined substantially along a third axis of rotation transverse to said first axis of rotation;
a first stage gear reduction driven by said at least one electric motor, said first stage gear reduction including a drive gear driven about said second axis of rotation by said at least one electric motor and a driven gear driven by said drive gear, and wherein said first and said second electric motors simultaneously drive said driven gear;
a second stage gear reduction driven by said first stage gear reduction, said second stage gear reduction including a pinion gear driven by said driven gear and a ring gear driven about said first axis of rotation by said pinion gear, said first axle shaft extending through said ring gear; and
a differential driven by said second stage gear reduction, said first axle shaft and said second axle shaft driven by said differential.

3. The axle assembly as recited in claim 1, wherein said driven gear and said pinion gear are coaxial.

4. The axle assembly as recited in claim 1, wherein said second axis of rotation is perpendicular to said first axis of rotation.

5. The axle assembly as recited in claim 1, wherein said third stage gear reduction comprises a two-speed module including an input directly coupled to said ring gear.

6. The axle assembly as recited in claim 5, wherein said differential is substantially contained within said two-speed module.

7. The axle assembly as recited in claim 1, wherein said first axle shaft, said second axle shaft and said ring gear are coaxial and with said driven gear directly driving said pinion gear, said pinion gear directly driving said ring gear, and said ring gear directly driving said differential.

8. The axle assembly as recited in claim 1, wherein said first axle shaft and said second axle shaft are each contained within a respective axle housing, said first and second axle shafts respectively operable to drive a wheel assembly.

9. The axle assembly as recited in claim 2, wherein said drive gear comprises a first drive gear that is driven by said first electric motor about said second axis of rotation and including a second drive gear driven by said second electric motor about said third axis of rotation wherein said first and said second drive gears are in direct meshing engagement with said driven gear.

10. The axle assembly as recited in claim 2, wherein said driven gear comprises a single driven gear coupled to said pinion gear such that said single driven gear and said pinion gear rotate about a fourth axis of rotation generally parallel to said second and third axes of rotation.

11. The axle assembly as recited in claim 3, wherein said driven gear comprises a single gear that drives said pinion gear about an axis of rotation generally parallel to said second axis of rotation.

12. An axle assembly comprising:
a first axle shaft defined substantially along a first axis of rotation;
a second axle shaft defined substantially along said first axis of rotation;
a first electric motor defined substantially along a second axis of rotation transverse to said first axis of rotation for driving both said first and said second axle shafts;
a second electric motor defined substantially along a third axis of rotation transverse to said first axis of rotation for driving both said first and said second axle shafts;
a first stage gear reduction driven by said first and second electric motors, said first stage gear reduction including a first drive gear driven about said second axis of rotation by said first electric motor and a second drive gear driven about said third axis of rotation by said second electric motor, said first drive gear and said second drive gear driving a driven gear;
a second stage gear reduction driven by said first stage gear reduction, said second stage gear reduction including a pinion gear driven by said driven gear and a ring gear driven by said pinion gear, said first axle shaft extending through said ring gear; and
a differential driven by said second stage gear reduction, said first axle shaft and said second axle shaft driven by said differential.

13. The axle assembly as recited in claim 12, wherein said first drive gear comprises a first singe gear driven by said first electric motor, said second drive gear comprises a second single gear driven by said second electric motor, and said driven gear comprises a third single gear driven by both said first and second single gears.

14. The axle assembly as recited in claim 12, wherein said ring gear is coaxial with said first axis of rotation.

15. The axle assembly as recited in claim 14, wherein said ring gear drives said differential.

16. The axle assembly as recited in claim 12, wherein said driven gear and said pinion gear are mounted along a common axis of rotation generally parallel to said second axis of rotation and said third axis of rotation.

17. The axle assembly as recited in claim 12, wherein said driven gear and said pinion gear are mounted along a common axis of rotation transverse to said first axis of rotation.

18. The axle assembly as recited in claim 12, wherein said pinion gear is directly mounted to said driven gear for rotation therewith.

19. The axle assembly as recited in claim 12, wherein said second axis of rotation and said third axis of rotation both intersect said first axis of rotation.

20. A drive system for a multi-axle vehicle comprising:
a frame which includes a pair of main longitudinal members;
a first axle shaft defined substantially along a first axis of rotation transverse to said pair of main longitudinal members;
an electric motor defined substantially along a second axis of rotation extending along a direction having at least a component extending parallel to said pair of main longitudinal members and transverse to said first axis of rotation, said first axis of rotation and said second axis of rotation contained within a common plane;
a first stage gear reduction including a drive gear driven by said electric motor and a driven gear which supports a pinion gear of a second stage gear reduction, said driven gear and said pinion gear mounted along a common axis of rotation generally parallel to said second axis of rotation; and
said second stage gear reduction being driven by said first stage gear reduction and including a ring gear driven about said first axis of rotation by said pinion gear, said first axle shaft extending through said ring gear and driven by said second stage gear reduction.

21. The drive system as recited in claim 20, further comprising a differential driven by said second stage gear reduction, said first axle shaft driven by said differential.

22. The drive system as recited in claim 21, wherein said ring gear drives said differential.

* * * * *

UNITED STATES PATENT AND TRADEMARK OFFICE
CERTIFICATE OF CORRECTION

| | | |
|---|---|---|
| PATENT NO. | : 7,028,583 B2 | Page 1 of 1 |
| APPLICATION NO. | : 10/630499 | |
| DATED | : April 18, 2006 | |
| INVENTOR(S) | : Bennett, John L. | |

It is certified that error appears in the above-identified patent and that said Letters Patent is hereby corrected as shown below:

Column 5, Line 53 please delete "singe" and insert --single--

Signed and Sealed this

Eighth Day of August, 2006

JON W. DUDAS
*Director of the United States Patent and Trademark Office*